United States Patent [19]

Edmondson

[11] 4,241,502
[45] Dec. 30, 1980

[54] CUTTER DEVICE

[76] Inventor: Harold L. Edmondson, 348 Bayview Rd., Rosebud, 3939 Victoria, Australia

[21] Appl. No.: 11,851

[22] Filed: Feb. 13, 1979

[30] Foreign Application Priority Data

Feb. 15, 1978 [AU] Australia .................. PD3380

[51] Int. Cl.³ .................................. B23D 27/02
[52] U.S. Cl. ........................................... 30/241
[58] Field of Search ................ 30/241, 242, 258

[56] References Cited

U.S. PATENT DOCUMENTS

| | | | |
|---|---|---|---|
| 1,890,234 | 11/1932 | Pickering | 30/241 X |
| 2,163,088 | 6/1939 | Grant | 30/258 |
| 2,629,927 | 3/1953 | Hartwell | 30/241 |
| 3,362,070 | 1/1968 | Huggins | 30/258 X |

Primary Examiner—Jimmy C. Peters
Attorney, Agent, or Firm—Andrus, Sceales, Starke & Sawall

[57] ABSTRACT

A cutter device for sheet material having a movable, flat, blade member; a frame; and a pair of parallel, spaced, blades fixed to the frame and between which the movable blade member is movable for cutting co-operation therewith. A lever arm is pivotally connected to the frame and is operative, in use, on the blade member to cause it to move between the pair of blades for cutting-co-operation therewith.

7 Claims, 4 Drawing Figures

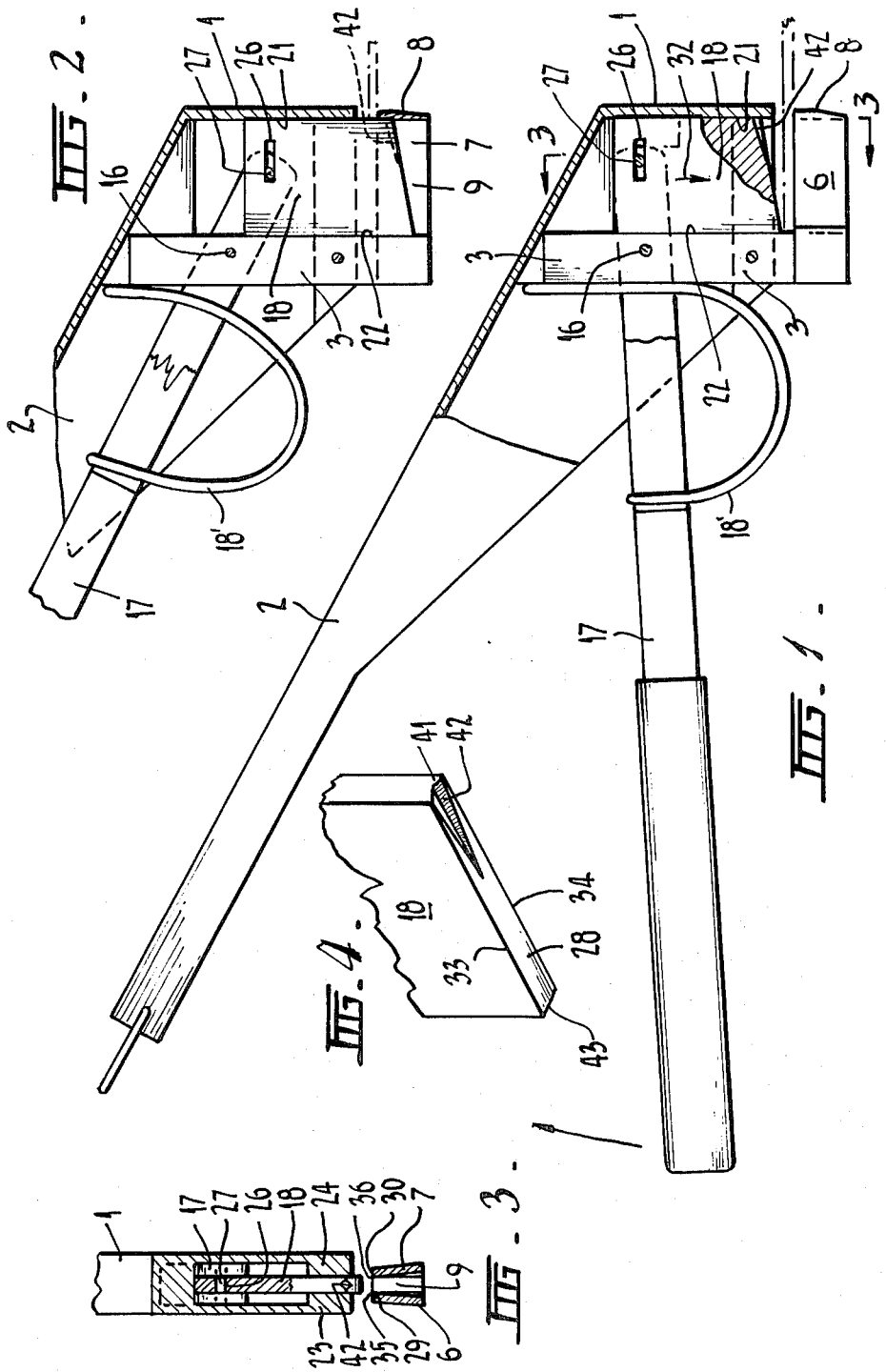

CUTTER DEVICE

FIELD OF THE INVENTION

This invention relates to a cutter device for use in cutting sheet material and, in particular, a cutter device for use in cutting steel material such as decking such as used for roofing and laminate such as laminated synthetic plastics material such as is used as bench and shelving coverings.

The present invention provides a cutter device for sheet material comprising a movable, flat, blade member, a frame, a pair of parallel, spaced, blades fixed to the frame and between which the movable blade member is movable for cutting co-operation therewith, a lever arm pivotally connected to the frame and operative, in use, on the blade member to cause it to move between the pair of blades for cutting co-operation therewith.

PREFERRED ASPECTS OF THE INVENTION

Preferably the lever arm is operative on the blade member to cause it to, in use, substantially linearly move in a direction for cutting and in reverse direction for retraction for preparation for cutting and for advancement of, or advancement to, a workpiece to be cut.

Preferably the blade member has a cutting edge inclined to the first mentioned direction and said reverse direction whereby the cutting edge has a leading and trailing end.

Preferably, the inclination of the cutting edge to said direction and said reverse direction is from 20° to 35°.

Preferably the pair of blades have surfaces, cutting co-operative with the blade member extending substantially in a plane perpendicular to said direction and said reverse direction.

Preferably the cutting edge has a groove therein extending from the trailing end towards the leading end.

Preferably said groove taperingly narrows in width and depth from the trailing end towards the leading end.

Preferably said groove is V-shaped in cross-section.

Preferably the sides of said groove make an angle with said direction and said reverse direction of from 45°–75°.

Preferably said groove extends along the cutting edge a distance of not less than ⅓ the length of said cutting edge.

Preferably said groove extends along the cutting edge a distance of not less than 10 mm.

SUMMARY OF THE INVENTION

According to another aspect of the invention, there is provided a cutter device for sheet material comprising a flat blade member, guide members fixed in spaced relation to define a substantially parallel guide-way in which the blade member is slidable, a first lever arm fixed adjacent one end thereof to at least one of the guide members and extending therefrom, and a second lever arm pivotally connected adjacent one end thereof to the blade member and to at least one of the guide members and extending from the guide members, the second arm being pivotable relative to the first arm with the arrangement being such that, with such pivoting of the second arm, the blade member is moved in the guide-way so that a cutting edge thereof moves between a position in which it is spaced from corresponding edges of the guide members or of a support member thereon to enable sheet material to be cut to be received therebetween and a position in which it co-operates with at least one of the corresponding edges for cutting sheet material so received.

Most conveniently the arms are relatively movable in a plane substantially parallel to that of the blade member and the guideway. However, it is to be appreciated that other arrangements are possible.

In one form of connection of the one end of the second lever arm, the pivotal connection to the blade member is nearer that one end. However, the reverse arrangement also is possible in a second form. In each case, the second lever arm may be bent at the pivot connection remote from the one end or on the side of that connection nearer the other end.

The device, with the cutting edge of the blade member spaced from the corresponding edges of the guide members, most conveniently defines a bight into which the sheet material to be cut is received. The bight may extend transversely of the direction of sliding movement of the blade member and be defined by either the blade member, the guide members or by a support member secured to or provided by an extension of the guide members. In the first case, a portion of the periphery of the bight defines the cutting edge of the blade member. In the latter cases, a portion of the periphery of the bight defines the corresponding edges of the guide members and provides backing support for the material to be cut.

The cutting face of the blade member most conveniently is inclined to the direction of movement of the former in the guideway so that the blade cuts sheet material from a leading end to a trailing end. The inclination may be from 20°–35°, most conveniently from 25°–30°. The trailing end may be formed so that an end edge of the cutting face is other than at right angles to the cutting direction, such as by that edge being of V-form, either external or reentrant.

A specific construction in accordance with this invention will now be described with the aid of the accompanying drawings.

BRIEF DESCRIPTION OF THE VIEWS OF THE DRAWINGS

FIG. 1 is a side elevation, partly cross-sectional, of a cutter device in accordance with this invention, FIG. 2 is a fragmentary view corresponding to FIG. 1 but showing parts in different position to what is shown in FIG. 1, FIG. 3 is a cross-section on line 3—3 in FIG. 1, and FIG. 4 is a perspective view of part of the cutting device.

DETAILED DESCRIPTION OF THE PREFERRED EMBODIMENT

The construction shown in the drawings comprises a frame 1 which has an extension at one end constituting an arm 2 rigidly fixed to the frame.

A sub-frame 3 extends from the frame 1 and supports blades 6 and 7 which are joined by a further blade 8 and which, with the sub-frame 3, define a generally rectangular slot 9.

Pivoted to the frame 1 and sub-frame 3 by means of a pivot pin 16 is a lever arm 17. A spring 18 acts between the frame 1 and lever arm 17 to bias the lever arm to take up the position shown in FIG. 1 and to exert a restoring force tending to restore the lever arm 17 to the position shown in FIG. 1 when it has been moved by a user to the position shown in FIG. 2.

A cutting blade 18 is located within the frame 1 and bears on portions 21 and 22 of the frame 1 and sub-frame 3: which portions 21 and 22 together with ends 23 and 24 of the frame 1, constituting guides for the blade 18.

The blade 18 has a slot 26 in which a pin 27 mounted on the lever arm 17 is located for operative movement of the blade 18 in response to movement of the lever arm 17.

The surface 28 of the blade 18 is inclined to the surfaces 29 and 31 of the blades 6 and 7 which are at right angles to the direction of travel of the blade 18 as indicated by arrow 32. The inclination to the surfaces 29 and 30 is from 20° to 35° (to the arrow 32 by 90 −(20 to 35) degrees (70° to 55°)).

The edges 33 and 34 of the surface 28 act as cutting edges in co-operation with the edges 35 and 36 of the surfaces 29 and 30.

As will be appreciated, the device as described above will be useful in cutting sheet material. However, towards the end of each cut, say, the last 3 mm, the 20° to 35° of shear provided by the aforesaid inclination will tend to reduce to zero and the amount of power required to operate the tool will increase. Still further, immediately before cutting has taken place the material to be cut is compressed at the point of the cut. Z The last mentioned problems can be at least in part overcome if the blade 18 is grooved as shown particularly in FIG. 4. The grooved part will cooperate with the further blade 8. In this respect, the trailing end 41 of the blade 18 has a V-shaped groove 42 therein which taperingly narrows both in depth and width towards the leading end 43. The flanks of the groove are inclined at an angle of 15° to 45° to the surfaces 29 and 30 (90−(15 to 45) degrees (75° to 45°) to the arrow 32).

The length of the groove 42 is preferably not less than ⅛ the length of the blade 42 with about 10 mm or more being more preferred as it is generally over that distance that the aforementioned effects become significant.

A significant advantage of the above described device is in cutting laminate in that if the blades 6 and 7 are about as thick as a sheet of laminate a sheet of laminate secured to a substrate and trimmed will project about the same distance as an edging strip of laminate.

The claims for part of the disclosure of this specification.

I claim:
1. A cutter device for cutting sheet material comprising:
   a frame;
   a flat blade member linearly reciprocally movable in a first direction for cutting the sheet material and in a reverse direction for retraction, said blade member having a flat cutting edge inclined to the direction of movement of said blade to form a leading end initially contacting the sheet material and a trailing end, said cutting edge having a groove therein extending from said trailing end towards and stopping short of said leading end;
   a lever arm pivoted on the frame and operatively connected to the blade member for effecting the reciprocal movement thereof;
   a pair of parallel, spaced blades fixed to the frame and between which the movable blade member extends for cutting cooperation therewith; and
   a further blade extending transversely between the ends of said pair of blades and adjacent the trailing end of said movable blade member for cutting cooperation between the grooved portion of said cutting edge and said further blade.

2. A cutter device as claimed in claim 1 wherein the inclination of said cutting edge to the direction of movement is from 55° to 70°.

3. A cutter device as claimed in claim 1 or 2 wherein said groove taperingly narrows in width and depth from said trailing end toward said leading end.

4. A cutter device as claimed in claim 3 wherein said groove is V-shaped in cross section.

5. A cutter device as claimed in claim 4 wherein the sides of said groove make an angle with the path of said movement of from 45° to 75°.

6. A cutter device as claimed in claim 1 wherein said groove extends along said cutting edge a distance not less than ⅛ the length of said cutting edge.

7. A cutter device as claimed in claim 6 wherein said groove extends along said cutting edge a distance not less than 10 mm.

* * * * *